Figure 1:
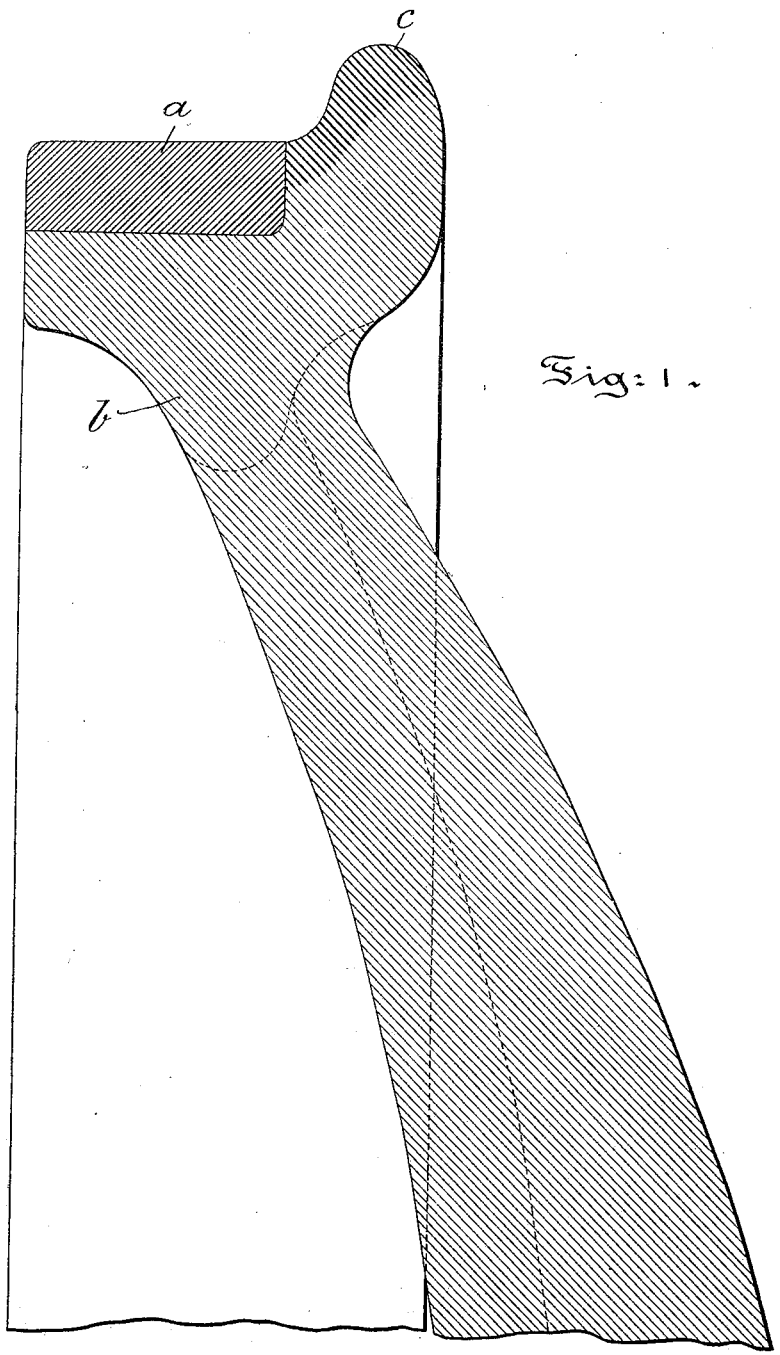

(No Model.) 2 Sheets—Sheet 1.

W. J. TAYLOR.
CAR WHEEL AND METHOD OF PRODUCING SAME.

No. 547,096. Patented Oct. 1, 1895.

Witnesses:
Thomas M. Smith.
Richard E. Maxwell

Inventor.
William J. Taylor,
By J. Walter Douglass.
Attorney.

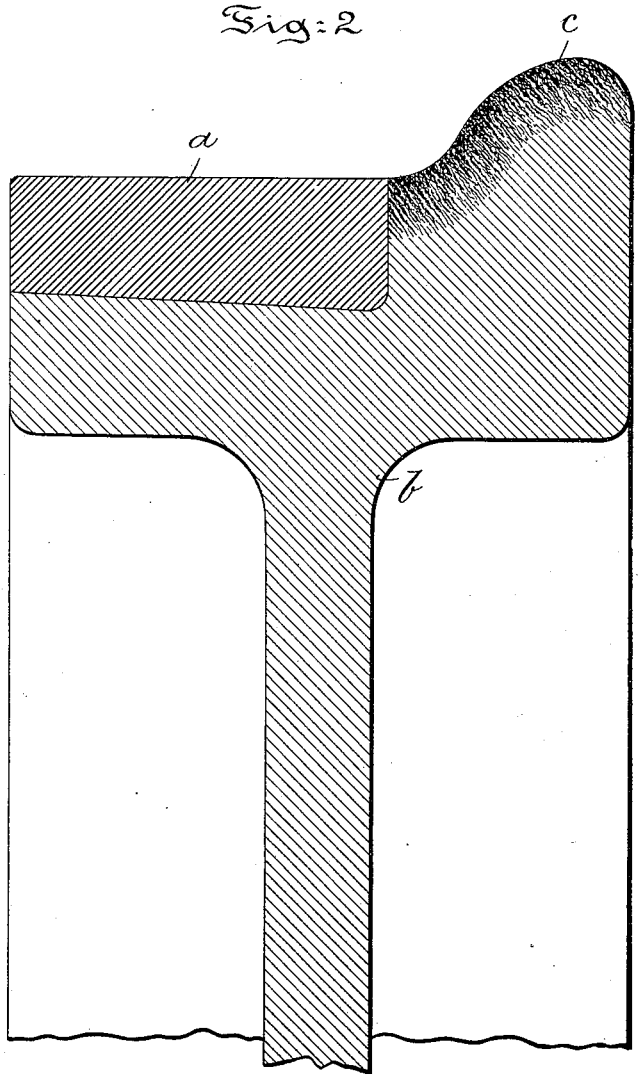

UNITED STATES PATENT OFFICE.

WILLIAM J. TAYLOR, OF BOUND BROOK, NEW JERSEY.

CAR-WHEEL AND METHOD OF PRODUCING SAME.

SPECIFICATION forming part of Letters Patent No. 547,096, dated October 1, 1895.

Application filed July 16, 1895. Serial No. 556,109. (No model.)

*To all whom it may concern:*

Be it known that I, WILLIAM J. TAYLOR, a citizen of the United States, residing at Bound Brook, in the county of Somerset and State of New Jersey, have invented certain new and useful Improvements in Car-Wheels and Mode of Producing the Same, of which the following is a specification.

My invention has relation to the manufacture of car-wheels particularly for the service of electric-motor cars; and it also has relation to the mode of producing such a wheel.

The principal objects of my invention are, first, to provide a comparatively simple, cheap, durable, and efficient wheel for electric-motor car-service in which flattening of the tread and undue wear of the flange in use is avoided; second, to provide a car-wheel which by the mode of its production is adapted especially for electric-motor car-service, in that by extended use it offers the best possible resistance to undue wear of the flange as well as the avoidance of the flattening of the tread thereof.

Hitherto it has been found in practice in the manufacture of wheels for electric-motor car-service, that in the use of the same metal in the rim for both tread and flange it offers poor resistance either to the flattening of the tread through the wheel sliding upon the rails with the brakes applied thereto or to undue wear of the flange of the wheel through rounding curves, both of which objectionable results incident to the use of wheels are calculated to shorten very materially the life thereof. To overcome the hereinabove-recited serious objections in the use of car-wheels has been a desideratum with car-wheel makers, and costly experimentation has been resorted to to obviate, if possible, flattening of the tread of a wheel as well as undue wear of the flange thereof, but without any degree of success, for the reason, as before stated, if a metal suitable to offer good resistance to flange wear is used for the entire rim it will show poor resistance to tread wear and will flatten. Again, on the other hand, if a metal is employed for the formation of the rim of the wheel that will resist tread wear and flattening such offers very poor resistance to flange wear.

My invention, stated in general terms, consists of the manufacture of a car-wheel so that flattening of the tread as well as undue wear of the flange thereof is obviated; and my invention further consists of the mode of making a car-wheel, substantially as hereinafter described and claimed.

The nature and general scope of my invention will be more fully understood from the following description, taken in connection with the accompanying drawings, forming part hereof, and in which—

Figure 1 is a broken central sectional view of a portion of a car-wheel embodying features of my invention, illustrating the tread as being composed of one metal and established with the body and flange of the wheel of another metal, the flange being represented as chilled; and Fig. 2 is a similar view of a slightly modified form of my invention, showing the tapered tread and chilled flange.

In order to enable others skilled in the art to which my invention appertains to understand and fully appreciate the practical features of novelty thereof, I will now proceed to describe a mode of constructing such a wheel of my invention, and for the purposes hereinbefore explained.

Referring to the drawings, $a$ in Fig. 1 is the tread, represented as having a body of substantially uniform thickness throughout and welded to or otherwise established with the body $b$ of the wheel. In Fig. 2 the tread is represented as having a tapered body established with the wheel by being preferably welded thereto. $c$ is the flange of the wheel, which is illustrated in the drawings as being chilled, the chill being indicated by the heavy lines merging with the light lines of the flange in Fig. 1, while in Fig. 2 by wave lines or scrolls merging or meshing into the cross-hatching of the body of the flange of the wheel.

In the production of a wheel of my invention the ring, rim, or hoop to constitute the tread $a$ is made of forged or rolled steel, and preferably of a composition or temper that will not flatten in service and also that will give good resistance to wear; and the flange is made of cast-iron, as well as the body of the wheel, the flange being chilled in order to resist tendency to curve-wear in use.

The mode of making a car-wheel of my invention is as follows: A ring, hoop, or tire of required dimensions and of substantially uniform thickness throughout, as illustrated in Fig. 1, or slightly thicker on the edge or side next the flange, as illustrated in Fig. 2, to constitute the tread of the wheel is provided and is heated to required temperature, so as preferably to be welded to molten cast-iron in order to form the body and flange of the wheel. This ring, hoop, or tire $a$ is then introduced into a mold just before the metal to constitute the body and flange of the wheel is poured. The molten iron by such operation is fused or welded to the hot steel rim or tire to form with the same one solid structure, while the flange of the wheel is chilled at the same time. It may be here remarked that when the steel ring, hoop, or tire $a$, constituting the tread, is welded to the body and flange of the wheel it becomes such an integral part of the entire structure that no elongation and consequent loosening of the tire can occur, arising from the wear thereof. In a word, the life and duration of such a wheel is prolonged beyond any wheel hitherto known without apparent or actual flattening of the tread or of undue wear of the chilled flange of the wheel.

Hitherto it has been proposed to provide a wheel in which the body was made of cast-iron and the tread of cast-steel embedded in and welded to the body thereof, and hence I do not wish to be understood as laying claim, broadly, to the making of such a wheel; but,

Having thus described the nature and objects of my invention, what I claim as new, and desire to secure by Letters Patent, is—

1. A car wheel having a tread of one metal and a body of another metal and a chilled flange, the metallic composition of which is the same as that of the body of the wheel, substantially as described.

2. A car wheel having a steel tread welded to a cast iron body and a chilled flange, the metallic composition of which is the same as said body, substantially as described.

3. A car wheel having a steel tread provided with a tapered body joined to the body of the wheel and a chilled flange, and the body and flange of the same metal, substantially as described.

4. A car wheel having a metal body provided with a chilled flange, and a tread of a different metal composition from that of the body and the flange of the same metal composition as the body, and the tread established with the body and flange of the wheel, substantially as described.

5. The method of making a car wheel, which consists in providing a metal ring, hoop or tire, heating the same to required temperature to establish with another metal in a molten state to form the body of the wheel, and introducing the same into a mold before the moment of pouring, and chilling the flange, of the same metal as said body substantially as and for the purposes described.

6. The method of making a car-wheel, which consists in providing a steel ring, hoop or tire, heating the same to required temperature to weld to iron in a highly molten state and introducing it into a mold just before the moment of pouring of the iron and chilling partially the iron flange at the same time, substantially as and for the purposes described.

In testimony whereof I have hereunto set my signature in the presence of two subscribing witnesses.

WM. J. TAYLOR.

Witnesses:
WILHELM VOGT,
THOMAS M. SMITH.